Sept. 2, 1941. H. C. RENTSCHLER ET AL 2,254,909
ULTRAVIOLET DISCHARGE LAMP
Filed March 28, 1939
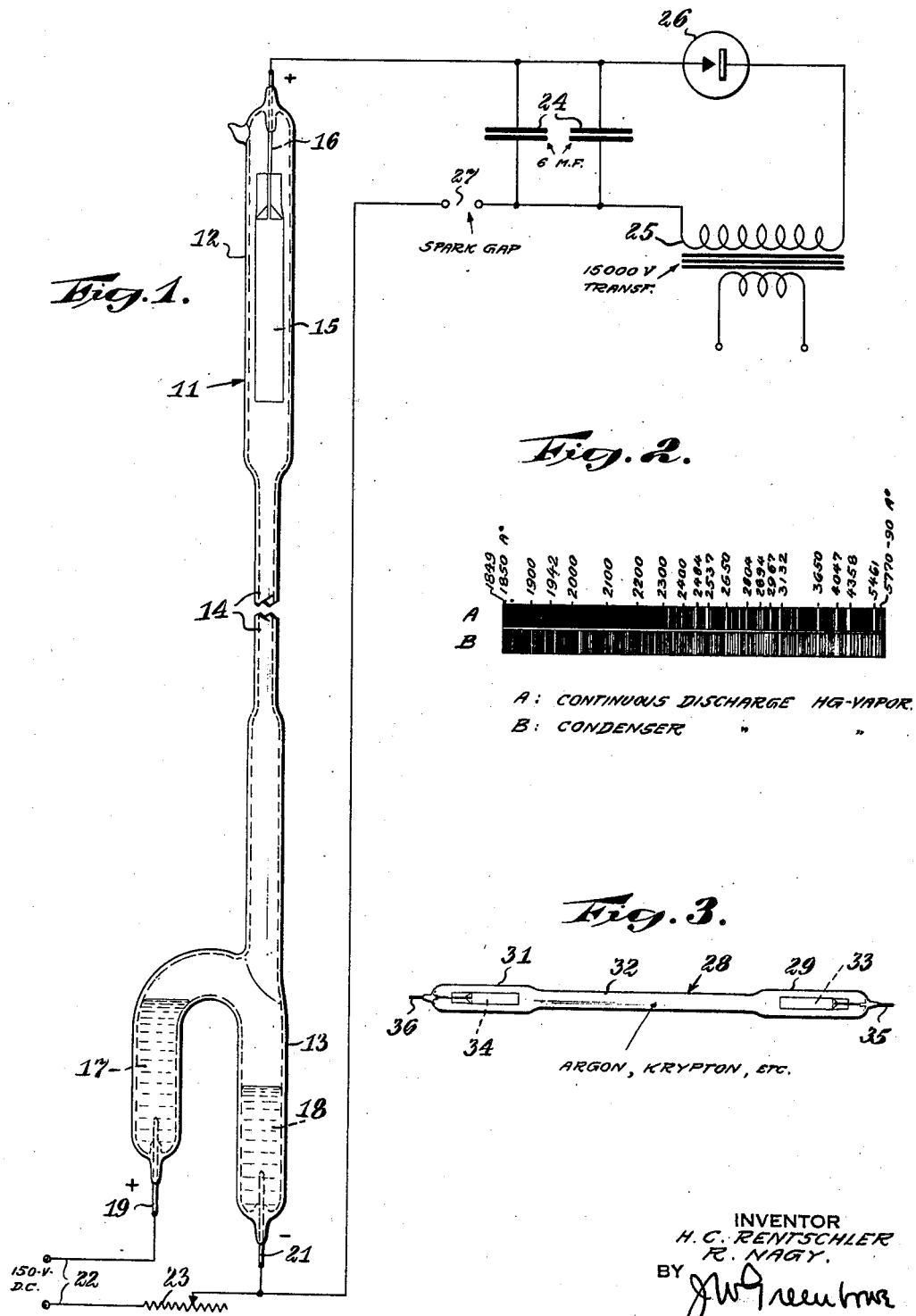
INVENTOR
H. C. RENTSCHLER
R. NAGY.
BY
ATTORNEY Patented Sept. 2, 1941

2,254,909

UNITED STATES PATENT OFFICE 2,254,909

ULTRAVIOLET DISCHARGE LAMP

Harvey C. Rentschler, East Orange, and Rudolph Nagy, Bloomfield, N. J., assignors to Westinghouse Electric & Manufacturing Company, East Pittsburgh, Pa., a corporation of Pennsylvania Application March 28, 1939, Serial No. 264,520

16 Claims. (Cl. 176—13)

This invention relates to discharge lamps, and more particularly to such adapted to generate strong ultra-violet radiation over a relatively wide band, or without concentration in a single line such as in resonance radiation.

The principal object of our invention, generally considered, is the generation of short-wave ultra-violet light.

Another object of our invention is the provision of a discharge lamp which may be operated to generate a relatively wide band of strong ultra-violet radiations.

A further object of our invention is the operation of a discharge lamp to produce a series of flashes, rather than a continuous light, as by means of a high voltage condenser discharge, with a spark gap or other control device in series.

A still further object of our invention is the development of a discharge lamp of abnormally high intensity for brief periods of time, whereby flashes of intense light may be produced at regular intervals.

An additional object of our invention is the development of a substantially continuous spectrum of short-wave length ultra-violet light, as by concentrating a high electrical discharge in mercury vapor.

Another object of our invention is the provision of a discharge device comprising an elongated envelope with a solid anode at one end, and an inverted U-shaped chamber containing two pools of mercury at the other end, whereby the desired mercury pressure may be maintained by causing a discharge between said pools of mercury, and the tube may be operated by using the cathode of said mercury pools as the cathode of the discharge device, in order to form intense flashes of light between said mercury pool and the solid anode at the other end of the envelope.

A further object of our invention is the provision of a discharge lamp comprising a hollow elongated envelope consisting of a pair of chambers connected by a quartz tube, a solid anode in each chamber, an ionizable medium enclosed in said envelope, and means for causing a condenser discharge between said electrodes in order to generate ultra-violet light of a large number of wave lengths so that the light has a substantially continuous spectrum.

Other objects and advantages of the invention, relating to the particular arrangement and construction of the various parts, will become apparent as the description proceeds.

Referring to the drawing illustrating our invention:

Figure 1 is an elevational view of one embodiment of our discharge lamp, the operating circuit for said lamp being shown diagrammatically.

Figure 2 shows a spectrogram, comparing the radiations produced by a continuous discharge through mercury vapor, with those produced by a condenser discharge through mercury vapor, in accordance with our invention.

Figure 3 is an elevational view of another embodiment of our invention.

For certain purposes, it is desirable to have strong ultra-violet radiation without concentrating it in a single line, such as that due to resonance. It is also desirable, for certain purposes, to use abnormally high intensities for a brief time only.

We have found that a condenser discharge through mercury vapor reverses the 2537 and 1849 A. U. lines, as well as making the 1942 A. U. line very weak, while bringing out a number of lines, between 1600 A. U. and 2500 A. U., which do not appear in an arc or glow tube, such as a "Sterilamp," that is, a discharge lamp such as manufactured under that trade-mark by the Westinghouse Electric & Manufacturing Company, or at least are very weak in such a device.

It is, therefore, one of the purposes of our invention, which will now be specifically described by reference to the accompanying drawing, in which like reference characters designate like parts, to concentrate all the discharge in mercury vapor and yet have a practical discharge device.

In Figure 1 there is shown an elongated envelope 11, consisting of end chambers 12 and 13 connected by a tubular portion 14, which should be formed of quartz or other vitreous material which efficiently transmits the desired shortwave ultra-violet radiations. The end chambers may, of course, be formed of quartz or the like, but this is not essential and it is more economical to form them of hard glass. In satisfactory embodiments of our invention, the tubular portion 14 may be three-eighths to one-half of an inch in diameter, and from six inches to three feet or more in length.

The chamber 12 contains a solid anode 15, which may be hollow cylindrical and formed of nickel, or other material of such character, and supported by means of a lead-in conductor 16. The cathode chamber 13, in the present embodiment, is formed inverted U-shape, as illustrated, and in the arms of said chamber are disposed pools 17 and 18 of mercury. Current may be conducted to said mercury through lead-in conductors 19 and 21, in order to develop a direct current discharge therebetween and produce an ionizable medium consisting of mercury vapor at a desired pressure in the otherwise preferably evacuated envelope 11. For this purpose, said lead-in conductors 19 and 21 are desirably connected to a one-hundred and fifty volt D. C. source 22, through a rheostat 23, the latter being adjusted until the desired mercury pressure, say less than two centimeters, or about two centimeters, is produced.

In order to cause the desired high intensity discharge through the tube 11, said tube is energized from one or more condensers 24, desirably having a capacity of about six microfarads, said condensers being desirably charged from a 15,000 volt transformer 25, operating through a high vacuum rectifier or "Kenetron" 26. The discharge through the tube 11, from the condenser or condensers 24, is controlled by means of a spark gap 27, or other control device, by adjusting the distance between the discharge elements thereof, as from about one-quarter to three-quarters of an inch.

In operating the tube 11, the negative terminal of the condenser or condensers is desirably connected to the cathode mercury pool 18 through lead-in conductor 21, the other condenser terminal being connected to the anode 15, the spark gap 27 being disposed between the condenser or condensers and either one of the discharge tube electrodes.

The connection with the direct current circuit, making the electrode 18 a cathode rather than an anode, is preferable, as the discharge between this and the anode 15 is then in the more direct line. This arrangement is not absolutely essential, but is desirable as avoiding, to some extent at least, the danger of breaking the glass or quartz in the bent portion of the envelope.

The greater the capacity of the condenser, and the higher the voltage to which it is charged, the greater will be the discharge current and the more intense will be the light or ultra-violet radiation emitted by the discharge device 11. This simply means that if we want to increase the intensity of the radiation, we should increase the necessary voltage by increasing the mercury vapor pressure. If the condenser flash were to be increased to several times that contemplated by the preferred arrangement disclosed, a higher mercury vapor pressure would be necessary, which could be obtained by increasing the voltage of the applied direct current from the source 22.

Instead of getting the proper mercury pressure by a direct current or other electrical discharge between electrodes at one end of the envelope, this pressure may be obtained by either enclosing the whole tube and maintaining it heated to the desired temperature, or by enclosing the mercury-containing cathode chamber in an oven and maintaining said oven at a temperature corresponding with the mercury pressure desired. The arrangement disclosed for producing a discharge between adjacent pools of mercury is, however, believed to be more satisfactory, although when applying the heat directly, as by means of an oven, a limited amount of mercury may be employed so that all is vaporized, thereby avoiding the danger of absorption of radiations by mercury condensed on the walls of the tube. If a limited amount of mercury is used it is clearly necessary to have a solid anode and a solid cathode between which the condenser discharge is to take place, as shown in Figure 3.

With the arrangements illustrated in Figure 1, mercury tends to distill from the cathode pool 18 to the anode pool 17, resulting in an operating elevation in said latter pool, higher than in the former, as illustrated.

Figure 2 makes a comparison between the radiations generated upon a continuous discharge through mercury vapor, and a condenser discharge through such vapor in accordance with Figure 1. The spectrum of a continuous discharge is shown by that portion of Figure 2 designated as A, said spectrum being discontinuous, or a "line" spectrum, with the strongest line at 2537 A. U., which is the radiation at resonance.

With a high intensity condenser discharge, in accordance with our invention, the radiation is substantially continuous consisting of a very large number of closely spaced lines throughout a relatively broad band in the ultra-violet, as attempted to be indicated as B in Figure 2, that is, there are no clearly distinct or separated "bright lines" evident until we get down below 2200 A. U. The intensity of the radiation below 2537 A. U. is abnormally high. The lines 2537 and 1949 A. U. are here indicated as absorption, reversed, or "dark lines" because the mercury vapor present in the outer layers acts to absorb the radiations of these resonance lines. It will, therefore, be seen that a very much better device is provided for the generation of short-wave ultra-violet radiations, than that where a continuous discharge is produced through a tube containing mercury vapor.

If argon, or other inert gas, such as krypton, hydrogen or nitrogen, or a mixture of two or more of said gases, is employed with mercury vapor, the mercury pressure is normally so low that practically the entire condenser discharge is carried by the gas and not by the mercury vapor. In such an event, therefore, the mercury may be dispensed with and a device such as shown in Figure 3, employed.

Referring now to the embodiment of our invention illustrated in Figure 3, there is shown an elongated envelope 28 consisting of end chambers 29 and 31 connected by a tubular portion 32, which should be formed of quartz or other vitreous material which efficiently transmits the desired short-wave ultra-violet radiations. The tube 28 desirably corresponds in size with the tube 11 of the preceding embodiment.

The chambers 29 and 31 of the present embodiment contain solid electrodes 33 and 34, each of which desirably corresponds generally with the anode 15 of the preceding embodiment. These electrodes are respectively supported on lead-in conductors 35 and 36. In the present embodiment, instead of using mercury vapor as the ionizable medium for conducting the discharge through the envelope, we use a gas such as argon, krypton, hydrogen, nitrogen, or a mixture thereof. The circuit for connection with the envelope 28 to produce a condenser discharge, may be identical with that of Figure 1, except that, of course, there is no connection to a direct current source for producing a mercury vapor pressure.

In the present embodiment, in order to reduce the necessary breakdown potential, the electrode 33 or 34, as the case may be, which is to be used as the cathode, or both, may desirably be coated on at least part of its surface, preferably the inside, with alkaline earth oxides or other material having high electron-emissivity, as is usual in such cases, and as will be understood by those skilled in the art.

The spectrum produced by a condenser discharge through a tube such as shown in Figure 3, is somewhat similar to the blue argon spectrum but very much more concentrated in the band below 2500 A. U. The radiation is even stronger than the spectrum produced from the mercury vapor source illustrated in Figure 1, and previously described. One discharge lasting only about one one hundred thousandth of a second produces about as much short wave radiation as a quartz mercury continuous discharge over a period of a minute or more. However, for the same pressure of ionizable medium, mercury is more effective in carrying condenser discharges than such an inert gas as contemplated in connection with the present embodiment and, therefore, for accomplishing comparable results, the inert gas pressure is desirably somewhat higher than the mercury vapor pressure of the preceding embodiment, say about two or more centimeters.

From the foregoing disclosure, it will be seen that we have devised a means for producing short-wave ultra-violet radiations on a relatively broad band by means of a high intensity discharge from a condenser, which may conveniently be kept in activated condition by connection with a high voltage transformer through a rectifier. The discharge from the condenser is desirably controlled by a variable spark gap, and the ionizable medium in the discharge device may be mercury vapor, desirably kept at a constant pressure by an auxiliary direct current arc or oven, or we may substitute for mercury vapor, one of the gases such as argon, krypton, hydrogen, nitrogen, or a mixture of two or more of them.

Although preferred embodiments of our invention have been disclosed, it will be understood that modifications may be made within the spirit and scope of the appended claims.

We claim:

1. A discharge lamp comprising a hollow elongated envelope consisting of a pair of chambers connected by a tubular portion transparent to short wave length ultra-violet radiations, a solid anode in one of said chambers, a cathode in the other chamber, an ionizable medium enclosed in said envelope, and means for supplying unidirectional current for causing condenser discharges between said electrodes, to generate ultra-violet light consisting of a very large number of strong lines in the short wave length ultra-violet spectrum.

2. A discharge lamp comprising a hollow elongated envelope consisting of a pair of chambers connected by a quartz tube, a solid anode in one of said chambers, a cathode in the other chamber, an ionizable medium enclosed in said envelope, and means for supplying unidirectional current for causing condenser discharges through said medium between said electrodes, to generate ultra-violet light consisting of a very large number of strong lines in the short wave length ultra-violet spectrum.

3. A discharge lamp comprising a hollow elongated envelope consisting of a pair of chambers connected by a tubular portion, a solid electrode in one of said chambers and adapted to function as an anode, an electrode in the other chamber adapted to function as a cathode, mercury vapor enclosed in said envelope, means for maintaining said mercury vapor at pressure of about two centimeters or less, and means for supplying unidirectional current for causing condenser discharges between said electrodes through said mercury vapor to generate ultra-violet light consisting of a very large number of strong lines in the short ultra-violet spectrum.

4. A discharge lamp comprising a hollow elongated envelope, a solid anode disposed in one end portion of said envelope, the other end portion of said envelope being of inverted U-shape, a pool of mercury in each of the arms of said U-shaped portion, in combination with means for causing a direct current electrical discharge between said pools to heat the mercury and develop a desired mercury vapor pressure in said envelope, and means for supplying unidirectional current for causing a condenser discharge between one of said mercury pools as a cathode and the other electrode as an anode, in order to generate ultra-violet light consisting of a very large number of strong lines in the short ultra-violet spectrum.

5. A discharge lamp comprising a hollow elongated envelope, a solid anode disposed in one end portion of said envelope, the other end portion of said envelope containing a pool of mercury, means for heating the mercury to develop a desired mercury vapor pressure in said envelope, in combination with means for supplying unidirectional current for causing condenser discharges between said mercury pool as a cathode and the other electrode as an anode, in order to generate ultra-violet light consisting of a very large number of strong lines in the short ultra-violet spectrum.

6. A discharge lamp comprising a hollow elongated envelope consisting of a pair of chambers connected by a tubular portion, an electrode in each chamber, said envelope containing an inert gas, in combination with means for supplying unidirectional current for causing condenser discharges between said electrodes through said gas to generate ultra-violet light consisting of a very large number of strong lines in the short wave length ultra-violet spectrum.

7. A discharge lamp comprising a hollow elongated envelope consisting of a tubular portion formed of quartz, a solid electrode in each end of said envelope, and one or a mixture of two or more of the gases argon, krypton, hydrogen and nitrogen at low pressure enclosed in said envelope, in combination with means for supplying unidirectional current for causing condenser discharges between said electrodes through said gas to generate ultra-violet light consisting of a very large number of strong lines in the short ultra-violet spectrum.

8. A discharge lamp comprising a hollow elongated envelope consisting of a tubular portion formed of quartz, a solid electrode in each end of said envelope, and argon at a pressure of about two or more centimeters enclosed in said envelope, in combination with means for supplying unidirectional current for causing condenser discharges between said electrodes through said argon to generate ultra-violet light consisting of a very large number of strong lines in the short ultra-violet spectrum.

9. A discharge lamp comprising a hollow elongated envelope consisting of a pair of hard glass chambers connected by a quartz tube, a solid anode in one of said chambers, the other chamber being of inverted U-shape, a pool of mercury in each of the arms of said latter chamber, in combination with means for causing an arc between said pools to heat the mercury and develop pressure of about two or less centimeters in said envelope, and means for supplying unidirectional current for causing condenser discharges between said solid electrode as anode and a mercury pool as cathode, to generate ultra-violet light consisting of a very large number of strong lines in the short ultra-violet spectrum.

10. In combination with a discharge lamp comprising an envelope containing an electrode at each end, means for producing a discharge in said envelpoe between said electrodes comprising a condenser, a rectifier, a high voltage transformer, and a spark gap, and means connecting said transformer to said condenser through said rectifier, and said condenser to said discharge lamp through said spark gap, so that no discharge occurs until the condenser is charged to the breakdown potential of the lamp, whereby a series of intense discharges, lasting very short periods of time, are produced in said lamp.

11. In combination with a discharge lamp comprising a hollow elongated envelope consisting of a pair of chambers connected by a quartz tube, a solid anode in one of said chambers, the other chamber being of inverted U-shape, a pool of mercury in each of the arms in said latter chamber, means for producing a direct current arc between the pools to heat the mercury and develop the desired mercury vapor pressure in said envelope, and means for producing a discharge between said solid anode and one of said pools through said mercury vapor, comprising a condenser, a rectifier, a high voltage transformer and a spark gap, and means connecting said transformer to said condenser through said rectifier, and said condenser to said discharge lamp through said spark gap, so that discharge is prevented until the condenser is charged to the breakdown potential of the lamp, whereby a series of intense discharges, lasting very short periods of time are produced in said lamp.

12. In combination with a discharge lamp having an elongated envelope consisting of a pair of hard glass chambers connected by a quartz tube, a solid anode in one of said chambers, the other chamber being of inverted U-shape, a pool of mercury in each of the arms of said last-mentioned chamber, means producing a direct current arc between said pools to develop a mercury vapor pressure of about two centimeters or less in said envelope, and means producing a series of intense discharges lasting very short periods of time between said anode and one of said pools through said mercury vapor, comprising a condenser, a rectifier, and a high voltage transformer with its secondary connected to the condenser through said rectifier, and said condenser connected to said lamp through a spark gap, so that discharge is prevented until the condenser is charged to the breakdown potential of the lamp.

13 In combination with a discharge lamp having an elongated envelope consisting of a pair of hard glass chambers connected by a quartz tube, a solid electrode in each of said chambers, gas at a pressure of about two centimeters or more in said envelope, and means producing a series of intense discharges lasting very short periods of time between said electrodes through said gas, comprising a condenser, a rectifier, and a high voltage transformer with its secondary connected to the condenser through said rectifier, and said condenser connected to said lamp through a spark gap, so that discharge is prevented until the condenser is charged to the breakdown potential of the lamp.

14. In combination with a discharge lamp comprising an envelope containing a pair of main electrodes, means for producing a discharge between said electrodes, said means comprising a source of unidirectional current, a condenser across the terminals of said source, a device for preventing a flow of current from said condenser until it is charged to a predetermined voltage, and means connecting said condenser to said electrodes through said device, so that no discharge occurs until the potential of said condenser reaches a predetermined voltage, whereby a series of intense discharges lasting very short periods of time are produced in said lamp.

15. In combination with a discharge lamp comprising an envelope containing a solid anode adjacent one end and an inverted U-shaped chamber at the other end, a pool of mercury in each of the arms of said chamber, means for heating said mercury to develop a vapor pressure of about two centimeters or less in said envelope, means for producing a discharge between said anode and one of said pools through said mercury vapor, said means comprising a source of unidirectional current, a condenser across the terminals of said source, a device for preventing a flow of current from said condenser until it is charged to a predetermined voltage, and means connecting said condenser to said electrodes through said device so that no discharge occurs until the potential of said condenser reaches a predetermined voltage, whereby a series of intense discharges lasting very short periods of time, are produced in said lamp.

16. In combination with a discharge lamp comprising an envelope containing a pair of solid electrodes and gas at a pressure of about two centimeters or more, means for producing a discharge between said electrodes through said gas, said means comprising a source of unidirectional current, a condenser across the terminals of said source, a device for preventing a flow of current from said condenser until it is charged to a predetermined voltage, and means connecting said condenser to said electrodes through said device so that no discharge occurs until the potential of said condenser reaches a predetermined voltage, whereby a series of intense discharges lasting very short periods of time are produced in said lamp.

HARVEY C. RENTSCHLER.
RUDOLPH NAGY.